(12) United States Patent
Ito

(10) Patent No.: US 6,820,471 B2
(45) Date of Patent: Nov. 23, 2004

(54) ENGINE SYSTEM DIAGNOSING APPARATUS AND METHOD

(75) Inventor: Tokiji Ito, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 269 days.

(21) Appl. No.: 10/101,879

(22) Filed: Mar. 21, 2002

(65) Prior Publication Data

US 2002/0144667 A1 Oct. 10, 2002

(30) Foreign Application Priority Data

Apr. 4, 2001 (JP) ........................................ 2001-106165

(51) Int. Cl.[7] ............................................. G01M 19/00
(52) U.S. Cl. ........................................ 73/118.1; 73/116
(58) Field of Search ................................. 73/116–118.1; 701/113–115; 123/142.5 R, 123, 142.5

(56) References Cited

U.S. PATENT DOCUMENTS 4,227,402 A * 10/1980 Dooley et al. ................. 73/115
5,255,733 A * 10/1993 King ............................ 165/299
6,244,232 B1 * 6/2001 Ban et al. .............. 123/142.5 R

FOREIGN PATENT DOCUMENTS

| JP | A 10-309933 | 11/1998 | |
| WO | WO 200237399 A1 * | 5/2002 | ........... G06F/19/00 |

* cited by examiner

*Primary Examiner*—Edward Lefkowitz
*Assistant Examiner*—Jermaine Jenkins
(74) *Attorney, Agent, or Firm*—Oliff & Berridge PLC

(57) ABSTRACT

Diagnosing apparatus and method diagnose an engine system provided with a heat accumulating device arranged to preheat an engine. A warm-up state of the engine system, before a warm-up operation of the engine by the heat accumulating device, is detected so that warm-up data representative of the detected warm-up state is stored in a memory, and the engine system is diagnosed to detect its warm-up state on the basis of the warm-up data stored in the memory. This arrangement permits accurate diagnosis of a warm-up state of an engine system.

36 Claims, 7 Drawing Sheets

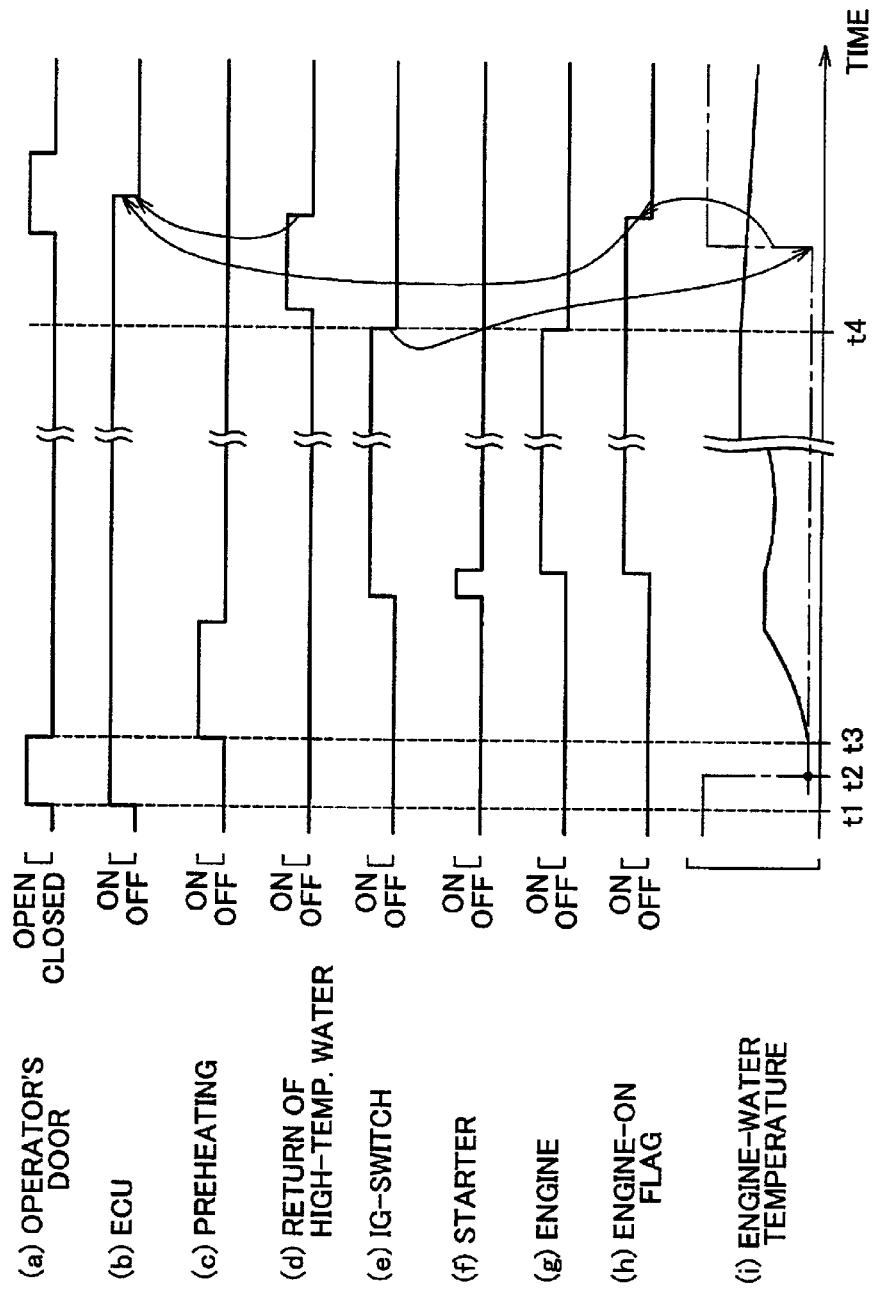

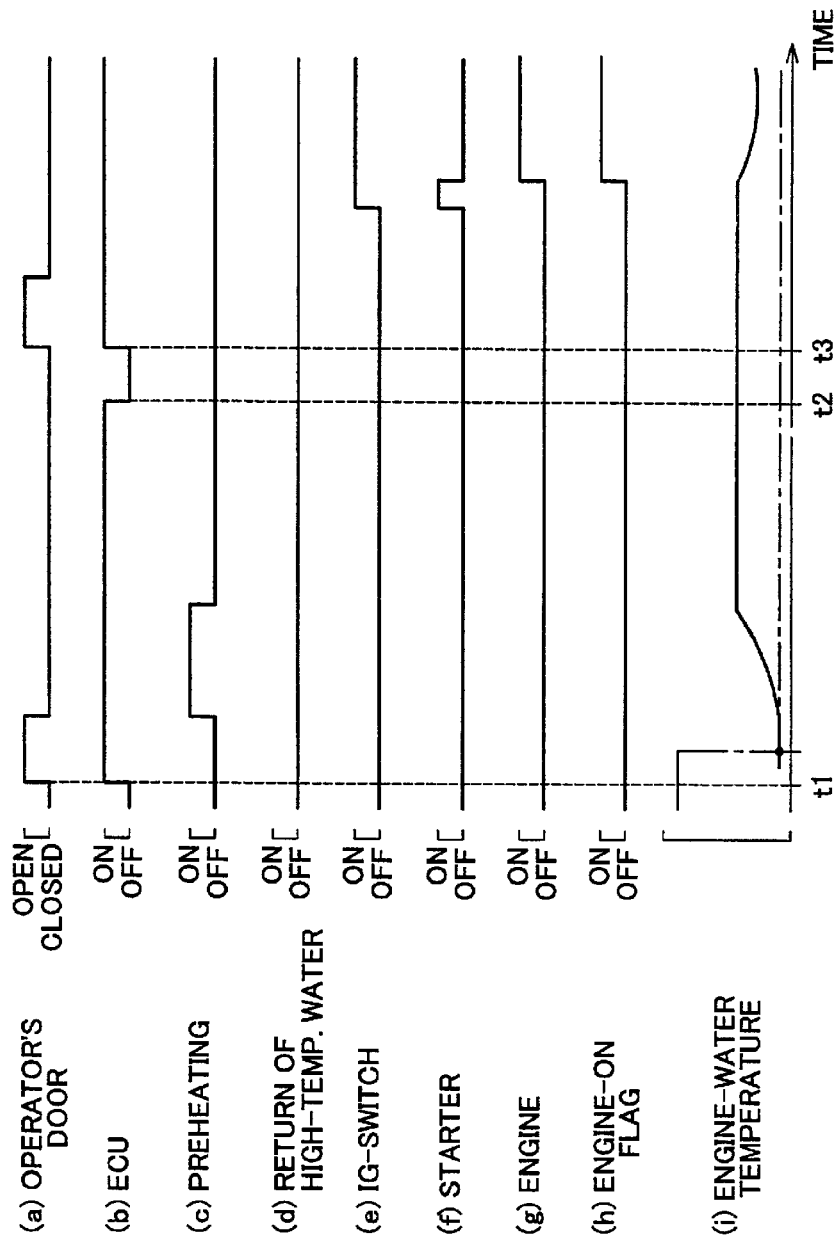

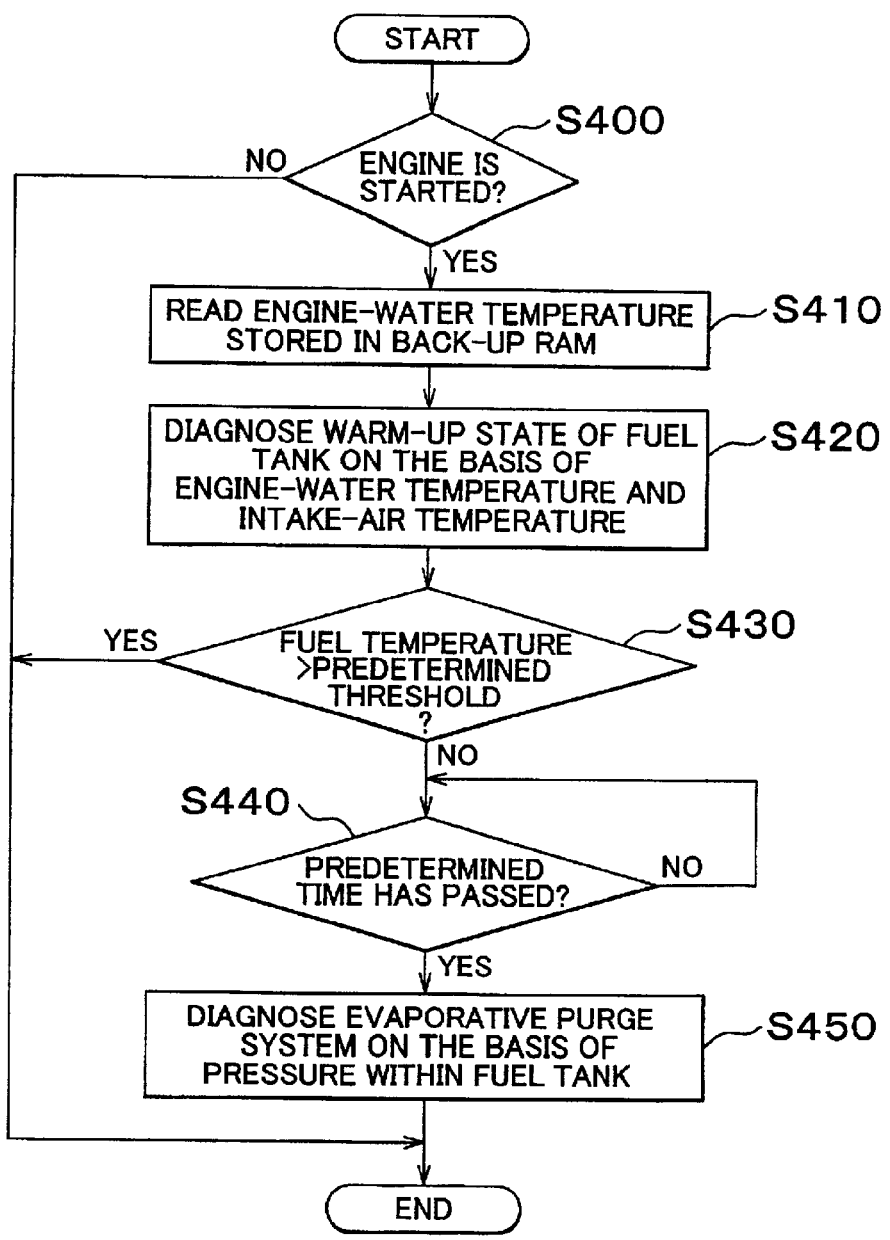

ENGINE SYSTEM DIAGNOSING APPARATUS AND METHOD

The disclosure of Japanese Patent Application No. 2001-106165 filed on Apr. 4, 2001, including the specification, drawings and abstract, is incorporated herein by reference in its entirety.

BACKGROUND OF THE INVENTION

1. Field of Invention

The present invention relates to an apparatus and a method for diagnosing an engine system, and more particularly to diagnosing apparatus and method for detecting or monitoring warm-up states of specific portions of an engine system equipped with a heat accumulating device for storing a heating medium or heat carrier for warming up an engine, at least upon starting of the engine in a cold state. The apparatus and method for diagnosing the engine system includes determining whether the diagnosis of the engine system is performed on the basis of the stored engine-water temperature data.

2. Description of Related Art

One conventional type of engine system employs an evaporative purge system wherein fuel vapor or fumes produced in a fuel tank is/are collected in a canister, and the canister is purged to discharge the collected fuel vapor into an intake passage, as needed.

Such an evaporative purge system generally includes a canister for collecting the fuel vapor produced in the fuel tank, a vapor passage for communication between the fuel tank and the canister, and a purge passage for communication between the canister and an intake passage of the engine. In this evaporative purge system, the purge passage is provided with a purge control valve operable between an open state and a closed state thereof, and the canister is provided with an atmosphere inlet valve operable to introduce the atmosphere into the canister.

For such an evaporative purge system as described above, there is known a diagnosing apparatus arranged to diagnose the system to detect a leakage flow of the fuel vapor out of an evaporative space which consists of interior spaces of the fuel tank, canister and vapor passage, and a portion of the purge passage between the canister and the purge control valve. The leakage flow may occur due to holes, cracks, cleavage or any other flaws of a structure which defines the evaporative space. Basically, this diagnosing apparatus is arranged to temporarily hold the atmosphere inlet valve in the closed state and disconnect the purge passage and the intake passage of the engine from each other, for thereby isolating the evaporative space from the engine, and diagnose the system for any abnormality on the basis of a change in the pressure within the thus isolated purge passage.

Namely, a leakage flow of the fuel vapor from the evaporative purge system causes communication of the purge passage with the atmosphere, resulting in a change of the pressure within the evaporative space eventually to the atmospheric level. In the absence of such a leakage flow of the fuel vapor, on the other hand, the pressure of a gaseous fuel within the evaporative space changes eventually to a saturated vapor pressure, so that the pressure within the evaporative space eventually becomes equal to a sum of the saturated vapor pressure and a partial pressure of gases other than the gaseous fuel. The evaporative purge system can be diagnosed on the basis of an amount of change of the pressure within the evaporative space, which varies depending upon whether the system suffers from a leakage flow of the fuel vapor or not.

However, the actual change of the pressure within the evaporative space does not depend solely on the presence or absence of the leakage flow of the fuel vapor, but depends also on various other parameters. For instance, when the temperature within the evaporative space is comparatively high where the evaporative space does not have any flaws, the pressure within the evaporative space tends to be higher than when the temperature is comparatively low. Since the pressure within the evaporative space is influenced by the various parameters, as described above, the pressure level within the evaporative space where the evaporative space suffers from a leakage flow of the fuel vapor is not necessarily appreciably different from that where the passages do not suffer from the leakage flow. For this reason, the conventional diagnosing apparatus does not permit an accurate diagnosis of the evaporative purge system.

One conventionally proposed solution to the drawback described above is to conduct a diagnosis of the evaporative purge system only when the engine is started in a cold state, as disclosed in JP-A-06-81728. That is, the partial pressure of the gaseous fuel within the evaporative space is relatively low when the engine is started in a cold state, so that the influence of the gaseous fuel on the pressure within the evaporative space can be suitably reduced, making it possible to improve the accuracy of the diagnosis.

For promoting the warm-up operation of the engine upon starting of the engine in a cold state, on the other hand, it has been proposed to provide the cooling system of the engine with a heat accumulating device. For example, the heat accumulating device has a passage for circulating a cooling water through the engine, a heat accumulator for storing the cooling water at a high temperature so that the high-temperature water flows through the passage, and an electrically operated pump for feeding the water so as to be circulated between the engine and the heat accumulator. The warm-up operation of the engine upon starting of the engine in the cold state can be promoted by the high-temperature water (heat medium) stored in the heat accumulator.

However, the diagnosing apparatus described above does not permit an accurate diagnosis of the evaporative purge system of the engine provided with the heat accumulating device described above. Described in detail, the warm-up operation of the engine by the heat accumulating device theoretically prevents the diagnosing apparatus from operating to diagnose the evaporative purge system, since the condition for operating the diagnosing apparatus is not satisfied when the engine is in the warmed-up state. Actually, the warm-up operation of the engine by the heat accumulating device does not necessarily heat the interior of the fuel tank to a sufficiently high temperature, so that the evaporative purge system may be diagnosed with high accuracy, in some cases, even where the engine is warmed-up by the heat accumulating device. That is, where the warm-up operation of the engine is effected by the heat accumulating device before starting of the engine, the diagnosing apparatus may erroneously determine that the condition for diagnosing the evaporative purge system is not satisfied, even when the condition is actually satisfied. Thus, there is a risk that the diagnosing apparatus does not permit an accurate diagnosis of the evaporative purge system where the warm-up operation of the engine is effected.

The erroneous determination regarding the condition for operating the diagnosing apparatus may take place not only in the diagnosis of the evaporative purge system, but also in other diagnostic operations in connection with the engine provided with the heat accumulating device to warm-up the engine before starting of the engine, when such diagnostic operations are conducted to check warm-up states of some specific portions of the engine other than the evaporative purge system.

SUMMARY OF THE INVENTION

The present invention was made in view of the drawback discussed above. It is therefore a first object of the present invention to provide a diagnosing apparatus for an engine system provided with a heat accumulating device in which the diagnosing apparatus permits an accurate diagnosis of the engine system to detect its warm-up state A second object of the invention is to provide a method of diagnosing such an engine system in which the method permits an accurate diagnosis of the engine system to detect its warm-up state.

The first object indicated above may be achieved according to a first aspect of the present invention, which provides a diagnosing apparatus for diagnosing an engine system to detect a warm-up state thereof. The engine system is provided with a heat accumulating device arranged to preheat an engine, comprising: a controller that detects a warm-up state of the engine system and stores warm-up data representative of the detected warm-up state in a memory before a warm-up operation of the engine by the heat accumulating device. The controller further performs the diagnosis of the warm-up state on the basis of the warm-up data stored in a memory.

The first object indicated above may be achieved according to another aspect of the present invention, which provides a diagnosing apparatus for diagnosing an engine system and determining whether the diagnosis is performed based on a detected warm-up state thereof. The engine system is provided with a heat accumulating device arranged to preheat an engine, comprising: a controller that detects a warm-up state of the engine system and stores warm-up data representative of the detected warm-up state in a memory before a warm-up operation of the engine by the heat accumulating device. The controller further determines whether the diagnosis of the engine system is performed on the basis of the warmup data stored in the memory.

The second object indicated above may be achieved according to a further aspect of this invention, which provides a method of diagnosing an engine system to detect a warm-up state thereof. The engine system is provided with a heat accumulating device arranged to preheat an engine. The method comprising the steps of: detecting the warm-up state of the engine system before a warm-up operation of said engine by the heat accumulating device; storing warm-up representative of the detected warm-up state in a memory; and performing a diagnosis of the warm-up state on the basis of the warm-up data stored in the memory.

The second object indicated above may be achieved according to a further aspect of the present invention, which provides a method of diagnosing an engine system and determining whether the diagnosis is executed based on a detected warm-up state thereof. The engine system is provided with a heat accumulating device arranged to preheat an engine. The method comprising the steps of: detecting the warm-up state of the engine system before a warm-up operation of said engine by the heat accumulating device; storing warm-up data representative of the detected warm-up state in a memory; and determining whether the diagnosis of the engine system is performed on the basis of the warm-up data stored in the memory.

In the diagnosing apparatus and method according to the present invention, the warm-up state of the engine system is detected before a warm-up operation of the engine by the heat accumulating device and the warm-up data representative of the detected warmup state is stored in the memory. The diagnosis of the warm-up state is performed on the basis of the stored warm-up data. Accordingly, the warm-up state of the engine system, before the warm-up operation of the engine, can be obtained even after the warm-up operation is performed by the heat accumulating device. Thus, the engine system can be diagnosed so as to permit accurate detection of the warm-up state at a desired specific portion or portions of the engine system.

BRIEF DESCRIPTION OF THE DRAWINGS

The above and other objects, features, advantages, and technical and industrial significance of this invention will be better understood by reading the following detailed description of a preferred embodiment of the invention, when considered in connection with the accompanying drawings, in which:

FIG. 5 is a time chart indicating an example of the operation to store the engine-water temperature data in the same embodiment;

FIG. 6 is a time chart indicating another example of the operation to store the engine-water temperature data; and FIG. 7 is a flow chart illustrating a diagnosing operation to diagnose the evaporative purge system in the same embodiment.

DETAILED DESCRIPTION OF EXEMPLARY EMBODIMENTS

In the following description and the accompanying drawings, the present invention will be described in more detail with reference to an exemplary embodiment.

The diagnosing apparatus for an engine system, as applied to an evaporative purge system of the engine, will be described as the exemplary embodiment of this invention, by reference to the accompanying drawings.

Figure 1:
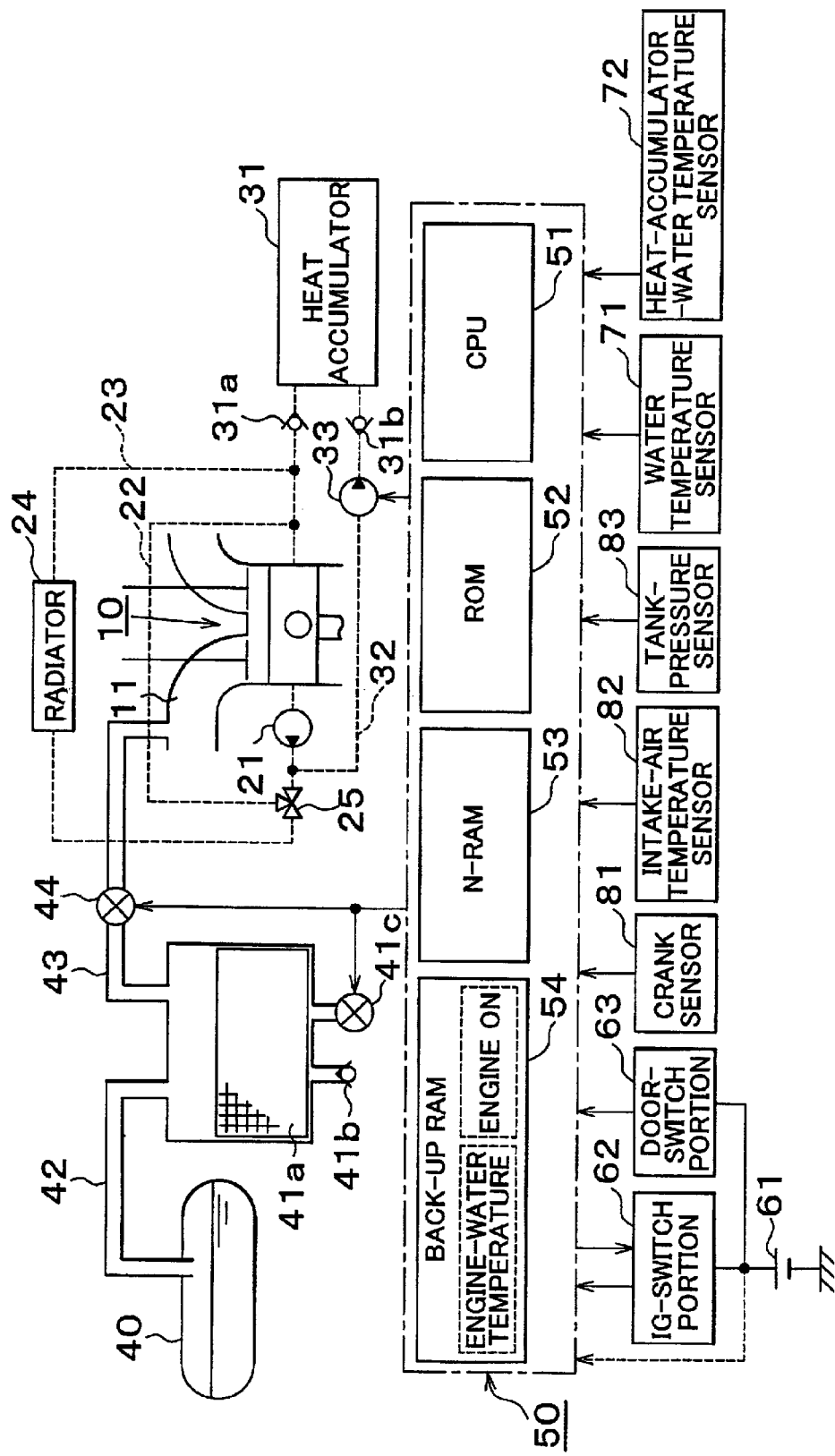
FIG. 1 is a view showing an overall arrangement of a diagnosing apparatus constructed according to one embodiment of this invention, to diagnose an evaporative purge system of an engine.

Referring first to FIG. 1, there is shown an overall arrangement of the diagnosing apparatus constructed according to the present embodiment, for diagnosing the evaporative purge system.

The engine 10 shown in FIG. 1 is a water-cooled engine which is cooled and heated by a cooling water or coolant used as a heat medium. To circulate the cooling water, the engine system in the present embodiment includes a water pump 21 which is driven by an output torque of a crankshaft (not shown) of the engine 10. The engine system has a water circulating passage which is connected to the water pump 21 and which includes a by-pass passage 22 and a cooling passage 23. The cooling passage 23 is provided with a radiator 24 for cooling the cooling water.

At a connection of the by-pass passage 22 and the cooling passage 23, there is disposed a thermostat 25 for circulating the cooling water through a selected one of those two passages 22, 23, which are formed through the engine 10. This thermostat 25 operates, depending upon the temperature of the cooling water, to select one of the two passages 22, 23, through which the cooling water is permitted to flow. Described more specifically, the thermostat 25 permits a flow of the cooling water through the by-pass passage 22 while inhibiting a flow of the cooling water through the cooling passage 23, for preventing a warmup operation of the engine 10, when the temperature of the cooling water (hereinafter referred to as "engine-water temperature") circulated through the engine 10 is lower than a predetermined lower limit. When the engine-water temperature is not lower than the lower limit, the thermostat 25 permits the flow of the cooling water through the cooling passage 23 while inhibiting the flow through the by-pass passage 22, so that the cooling water is cooled by the radiator 24.

The engine system described above is further provided with a heat accumulating device arranged to warm-up the engine 10 before starting of the engine 10. The heat accumulating device includes a heat accumulator 31, a warm-up passage 32 serving as a passage connecting the heat accumulator 31 and the engine 10, and an electrically operated pump 33 operable to circulate the cooling water between the heat accumulator 31 and the engine 10. The heat accumulator 31 is arranged to store the cooling water such that the cooling water is held at a temperature high enough to warm-up the engine 10.

The heat accumulator 31 is a container for storing the cooling water while accumulating or absorbing heat of the cooling water. This heat accumulator 31 is provided on its outlet side with a one-way valve 31a, and on its inlet side with a one-way valve 31b. With an operation of the electrically operated pump 33, the cooling water is fed into the heat accumulator 31 through the one-way valve 31b, and a mass of the high-temperature cooling water stored in the heat accumulator 31 is discharged or delivered therefrom through the one-way valve 31a.

Then, the evaporative purge system of the engine system will be described. The evaporative purge system includes a fuel tank 40, and a canister 41 for collecting and storing fuel vapor (fumes) produced in the fuel tank 40. The evaporative purge system has a vapor passage 42 for communication between the fuel tank 40 and the canister 41, and a purge passage 43 for communication between the canister 41 and an intake passage 11 of the engine 10.

The canister 41 accommodates an adsorbent (charcoal) 41a which temporarily adsorbs and accommodates the fuel vapor. The fuel vapor adsorbed in the adsorbent 41a is separated from the adsorbent 41a when the pressure within the canister 41 is reduced.

To facilitate the adsorption and separation of the fuel vapor within the canister 41, the evaporative purge system includes the following elements. The canister 41 is provided with an atmospheric-pressure valve 41b which is opened to discharge an excess amount of air from the canister 41 when the pressure within the canister 41 has exceeded a predetermined upper limit higher than the atmospheric pressure. Further, the purge passage 43 is provided with a purge control valve 44 operable to selectively connect the canister 41 and the intake passage 11 of the engine 10 to each other or disconnect them from each other. The purge control valve 44 may be a solenoid-operated valve, for example. The canister 41 is further provided with an atmosphere inlet valve 41c for introducing the atmosphere into the canister 41. This atmosphere inlet valve 41c may be a solenoid-operated valve, for example.

The fuel vapor adsorbed in the adsorbent 41a within the canister 41 is separated from the adsorbent 41a, when the pressure within the canister 41 is reduced by opening the atmosphere inlet valve 41c and the purge control valve 44.

The present engine system further includes an electronic control unit (hereinafter abbreviated as "ECU") 50, a detecting device for detecting a preliminary operation performed before starting of the engine 10, a power supply device (e.g., battery 61) for supplying the ECU 50 with electric power, and various sensors for detecting various characteristics of the engine system and supplying the ECU 50 with their output signals indicative of the detected characteristics of the engine system. The ECU 50 is arranged to control the engine 10, the heat accumulating device and the evaporative purge system.

The ECU 50 incorporates a central processing unit (CPU) 51, a ROM 52, a back-up RAM 54, and a normal RAM (hereinafter abbreviated as "N-RAM") 53. The CPU 51 is arranged to perform data processing operations on the basis of the output signals of the various sensors. The ROM 52 stores various programs used by the CPU 51 to perform the data processing operations. The back-up RAM 54 serves as a nonvolatile memory which is kept supplied with electric power, irrespective of whether the ECU 50 is supplied with electric power or not. The N-RAM 53 is supplied with electric power only when the ECU 50 is supplied with electric power.

Since the back-up RAM 54 is kept supplied with electric power, data stored in the back-up RAM 54 is retained irrespective of whether the ECU 50 is in an on state or not, that is, supplied with electric power or not. On the other hand, data stored in the N-RAM 53 is erased when the ECU 50 is turned off by removal of electric power therefrom, since the N-RAM 53 is supplied with the electric power only when the ECU 50 is in the on state.

The ECU 50 is turned on by application of electric power, when a preliminary operation performed before starting of the engine 10 is detected. In this embodiment, the preliminary operation is detected when the above-indicated detecting device detects one of an operation of an ignition-switch operating portion provided near a driver's seat of a vehicle equipped with the present engine system, and an opening action of a door (hereinafter referred to as "vehicle-operator's door") disposed on the side of the vehicle-operator's seat, for example. When the operation of the ignition-switch operating portion or the opening action of the vehicle-operator's door is detected, the ECU 50 is supplied with the electric power.

In the present embodiment, the above-indicated power supply device includes a battery 61, while the above-indicated detecting device includes an ignition-switch portion (IG-switch portion) 62 and a door-switch portion 63.

The IG-switch portion 62 includes the above-indicated ignition-switch operating portion, an ignition switch and a relay. The ignition-switch operating portion is used to turn on and off the ignition switch. The ECU 50 is turned on when the ignition switch is turned on, and is turned off when the ignition switch is turned off. However, the relay is provided to hold the ECU 50 in the on state with the electric power being applied thereto for a predetermined length of time even after the ignition switch is turned off, so that the ECU 50 is operable for this length of time. The ignition-switch operating portion is used to turn on and off an engine starter (not shown) as well as the ignition switch. The door-switch portion 63 is provided to detect the opening action of the vehicle-operator's door. The ECU 50 is turned on also when the opening action is detected.

When the preliminary operation performed before starting of the engine 10 is detected by the IG-switch portion 62 or the door-switch portion 63, the ECU 50 operates to detect a warm-up state of the engine 10, in the diagnosing apparatus according to the present embodiment. If the engine 10 is not in a fully warmed-up state, the engine 10 is warmed up by the heat accumulating device before starting of the engine 10.

Described in more detail, the warm-up state of the engine 10 is detected on the basis of the temperature of the cooling water (engine-water temperature) circulated through the engine 10. When the detected engine-water temperature is lower than the predetermined lower limit, the engine 10 is warmed-up (preheated) for a predetermined suitable time by the high-temperature cooling water stored in the heat accumulator 31. In the present embodiment, the starting of the engine 10 is inhibited until this preheating of the engine 10 is terminated.

It is noted that the engine 10 is not necessarily started after the preliminary operation performed before starting of the engine 10 is detected as described above. For instance, the engine 10 may not be started after the opening action of the vehicle-operator's door is detected, where the door is opened for the purpose of taking a baggage out of the vehicle, for instance. In view of this, the ECU 50 is turned off when a predetermined time has passed after the termination of the preheating of the engine 10, without an operation of the ignition-switch operating portion.

When the ECU 50 is turned off after the preheating of the engine 10 as described above, it may be desirable to return the high-temperature cooling water from the engine 10 back to the heat accumulator 31. In the present embodiment, the cooling water is returned from the engine 10 back to the heat accumulator 10 before removal of electric power from the ECU 50, if the engine-water temperature is higher than the temperature of the cooling water within the heat accumulator 31 (hereinafter referred to as "heat-accumulator-water temperature).

To control the operations described above, the present engine system uses a water temperature sensor 71 for detecting the temperature of the cooling water circulated through the engine 10 or a physical quantity corresponding to this temperature, and a heat-accumulator-water temperature sensor 72 for detecting the heat-accumulator-water temperature or a physical quantity corresponding to this temperature.

Figure 2:
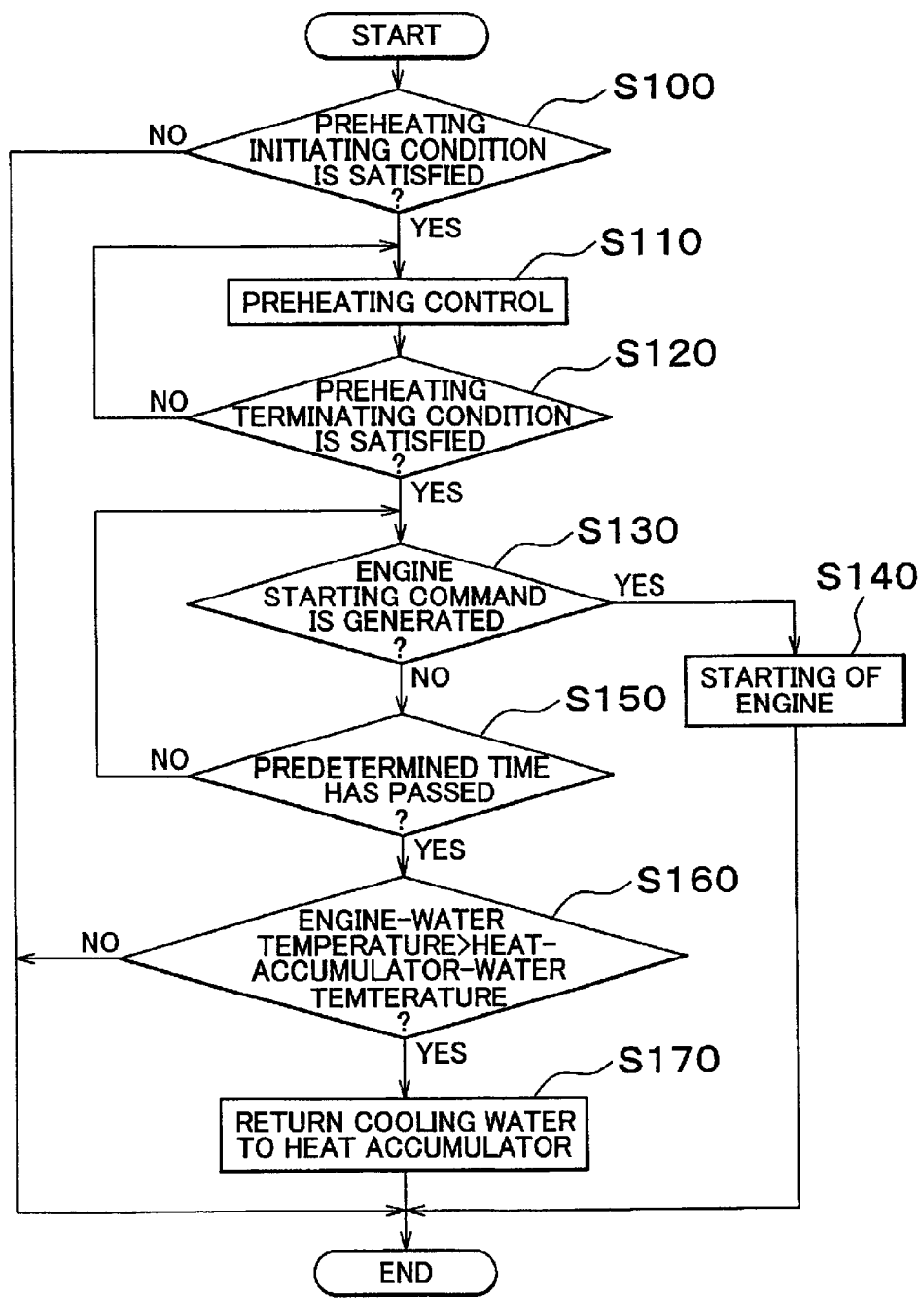
FIG. 2 is a flow chart illustrating a preheating operation performed in the embodiment of FIG. 1.

Referring next to FIG. 2, there will be described a preheating operation of the engine 10 after the ECU 50 is turned on by application of electric power thereto as a result of detection of the preliminary operation.

FIG. 2 is a flow chart illustrating the preheating operation, which is repeatedly performed with a predetermined cycle time. The preheating operation is initiated in step S100 to determine whether a preheating initiating condition is satisfied. For instance, the preheating initiating condition is satisfied when the engine-water temperature is lower than a predetermined threshold, when a predetermined time has not passed after the ECU 50 is turned on, and when the engine 10 is in the non-operated state.

If it is determined that the preheating initiating condition is satisfied, the control flow goes to steps S110 and S120 to preheat the engine 10 until the engine 10 has been sufficiently warmed up. That is, until a preheating terminating condition is satisfied. For example, a determination as to whether the preheating terminating condition is made according to a logical sum of a fact that the engine-water temperature has been raised to the predetermined threshold or higher, and a fact that a predetermined time has passed after the initiation of the preheating operation. That is, the preheating terminating condition is satisfied when the engine-water temperature has been raised to the predetermined threshold or higher, and/or when a predetermined time has passed after the initiation of the preheating operation.

When the preheating operation is terminated as described above, the starting of the engine 10 is permitted. Namely, the control flow goes to steps S130 and S140 to start the engine 10 when an engine starting command is generated as a result of an operation of the ignition-switch operating portion. If it is detected in step S130 that the engine starting command is absent, the control flow goes to step S150 to determine whether a predetermined time has passed after the termination of the preheating operation. When this predetermined time has passed, the control flow goes to step S160 to determine whether the high-temperature cooling water should be returned from the engine 10 back to the heat accumulator 31. This determination is effected by determining whether the engine-water temperature is higher than the heat-accumulator-water temperature. If it is determined that the cooling water should be returned to the heat accumulator 31, the control flow goes to step S170 to return the cooling water from the engine 10 to the heat accumulator 31.

One cycle of execution of the present preheating routine is terminated if it is determined in step S100 that the preheating initiating condition is not satisfied, if the engine 10 has been started in step S140, or if it is determined in step S160 that the engine-water temperature is not higher than the heat-accumulator-water temperature.

The present engine system is further arranged to return the high-temperature cooling water from the engine 10 back to the heat accumulator 31 before removal of the electric power from the ECU 50, if the engine-water temperature is higher than the heat-accumulator-water temperature, also in the case where the ECU 50 is turned off as a result of detection that the ignition switch is turned off.

There will next be described an operation performed by the diagnosing apparatus according to the present embodiment, to diagnose the evaporative purge system. The diagnosing apparatus is basically arranged to close the purge control valve 44 and the atmosphere inlet valve 41c shown in FIG. 1, thereby isolating an evaporative space of the evaporative purge system from the engine 10 and the atmosphere. The evaporative space includes interior spaces of the fuel tank 40, vapor passage 42, canister 41, and a portion of the purge passage 43 between the canister 41 and the purge control valve 44. The diagnosing apparatus diagnoses the evaporative purge system on the basis of a change of the pressure within the evaporative space. In this respect, it is noted that an influence of the fuel vapor on the change of the pressure within the evaporative space is relatively small when the temperature of the fuel within the fuel tank 40 is sufficiently low.

In the absence of a leakage flow of the fuel vapor from the evaporative space, the pressure within the evaporative space is lowered by consumption of the fuel stored in the fuel tank 40. In the presence of a leakage flow of the fuel vapor from the evaporative space, however, the pressure within the evaporative space is held substantially constant at the atmospheric level. Accordingly, only in the absence of the leakage flow, the pressure within the evaporative space can be lower than the atmospheric pressure by more than a predetermined amount, so that the evaporative purge system can be diagnosed on the basis of a change of the pressure within the evaporative space.

Usually, the warm-up state of the fuel within the fuel tank 40 is detected or monitored on the basis of the temperature of the intake air introduced into the engine 10 or the engine-water temperature. Where the preheating operation to preheat the engine 10 is performed before starting of the engine 10, the warm-up state of the fuel cannot be accurately detected on the basis of the warm-up state of the engine 10, as described above in the

BACKGROUND OF THE INVENTION

In view of the above, the present diagnosing apparatus is arranged to detect the warm-up state of the engine 10 before the preheating operation, and store the detected warm-up state in the back-up RAM 54. More specifically, the engine-water temperature is detected when the ECU 50 is turned on with electric power application thereto. Engine-water temperature data indicative of the detected engine-water temperature is stored in the back-up RAM 54. On the basis of the stored engine-water temperature data, the warm-up state of the fuel within the fuel tank 40 is detected. In the alternative, the ECU 50 can determine whether the diagnosis is performed on the basis of the stored engine-water temperature data.

When the ECU 50 is turned on and off repeatedly in a relatively short time in response to repeated opening and closing actions of the vehicle-operator's door disposed near the vehicle-driver's seat, the engine-water temperature data stored in the back-up RAM 54 is updated as the preheating operation is repeatedly initiated and terminated. To prevent an influence of the preheating operation on the engine-water temperature data in the above case, the updating of the engine-water temperature data is effected on the basis of stored hysteresis data indicating a previous switching action of the ignition switch from the on state to the off state during an operation of the engine 10.

In particular, the engine-water temperature represented by the engine-water temperature data stored in a predetermined portion of the back-up RAM 54 is reset or initialized to a predetermined initial value on the basis of a fact that the ignition switch has been turned off during an operation of the engine 10. Only when the engine-water temperature data stored in the back-up RAM 54 represents the predetermined initial value, the ECU 50 permits this initial value to be replaced by a temperature value as detected by the above-indicated water temperature sensor 71. That is, the ECU 50 permits the engine-water temperature data to be updated according to the engine-water temperature presently detected by the water temperature sensor 71. The predetermined initial value of the engine-water temperature is set to be considerably higher than an actual temperature at the time of starting of the engine 10, and would not be actually established at the time of starting of the engine 10.

More specifically, the hysteresis data indicating the starting of the engine 10 and the subsequent stopping of the engine 10 in response to a switching action of the ignition switch from the on state to the off state are stored in the N-RAM 53. On the basis of the stored hysteresis data, the engine-water temperature data stored in the back-up RAM 54 is initialized by the ECU 50 as a part of a post-processing operation performed after the ignition switch is turned off. The ECU 50 is turned off after the post-processing operation.

In the present embodiment, the engine-water temperature data stored in the back-up RAM 54 is copied in the N-RAM 53 before the ECU 50 determines whether the engine-water temperature data represent the initial temperature value. That is, whether the engine-water temperature data should be updated. To effect this determination, the N-RAM 53 rather than the back-up RAM 54 is accessed to read the engine-water temperature data. The present embodiment is further adapted to store the above-indicated hysteresis data in the form of an ENGINE-ON flag in the back-up RAM 54. The hysteresis data is erased, that is, the ENGINE-ON flag is reset, after the engine-water temperature data is initialized and before the ECU 50 is turned off.

To perform the diagnosing operation, the present engine system uses a crank sensor 81 for detecting a rotating state of an output shaft (not shown) of the engine 10, an intake-air temperature sensor 82 for detecting the temperature of the intake air in the intake passage 11 of the engine 10, and a tank-pressure sensor 83 for detecting the pressure within the fuel tank 40, as indicated in FIG. 1.

Figure 3:
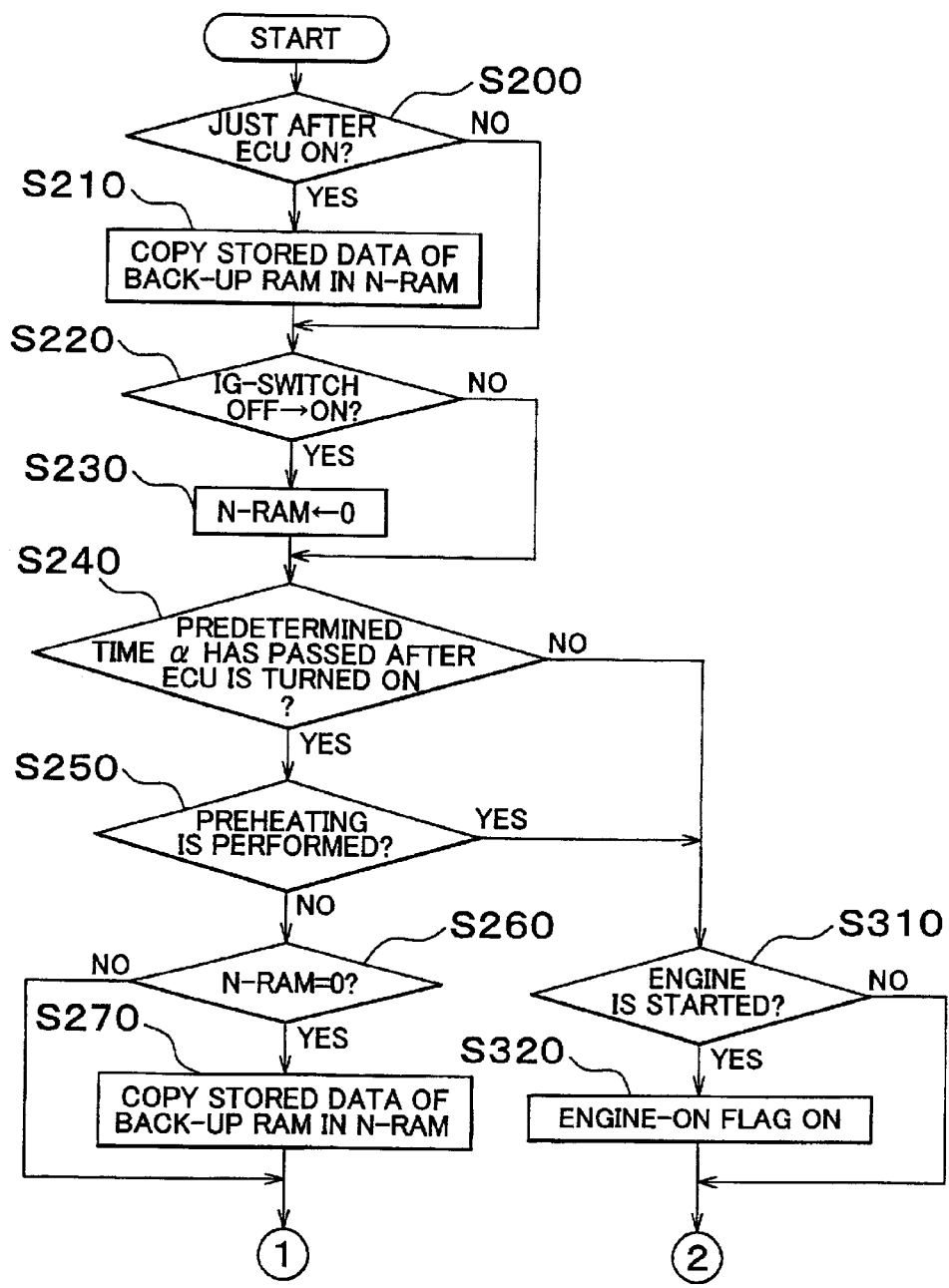
FIG. 3 is a flow chart illustrating a part of an operation to store engine-water temperature data before the preheating operation in the same embodiment.
Figure 4:
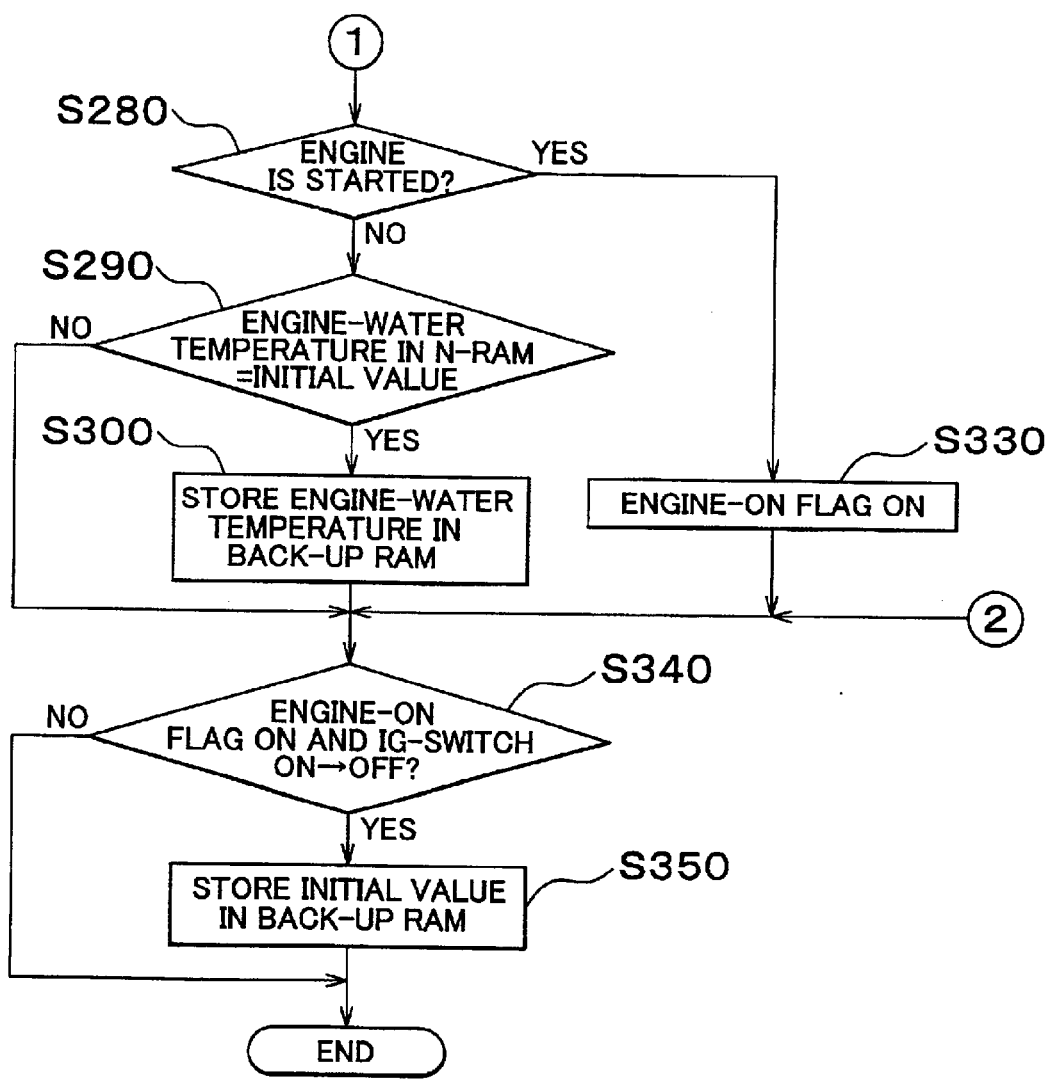
FIG. 4 is a flow chart illustrating the other part of the operation to store the engine-water temperature data.

Reference is now made to the flow charts of FIGS. 3 and 4, which describes an operation to store the engine-water temperature data in the back-up RAM 54 according to the present embodiment. This operation is repeatedly executed with a predetermined cycle time.

The operation illustrated in the flow charts of FIGS. 3 and 4 is initiated with steps S200 and S210, to copy the engine-water temperature data stored in the back-up RAM 54 to the N-RAM 53 immediately after the ECU 50 has been turned on. Step S210 is followed by steps S220 and S230 to clear the N-RAM 53 when the ignition switch is switched from the off state to the on state.

Then, the control flow goes to step S240 to determine whether a predetermined time $\alpha$ has passed after the ECU 50 is turned on, and step S250 to determine whether the preheating operation has been performed. The predetermined time $\alpha$ is determined such that the output signal of the water temperature sensor 71 indicative of the engine-water temperature is stabilized when the predetermined time $\alpha$ has passed. The determination in Step S250 is provided to store the engine-water temperature data in the back-up RAM 54 before the preheating operation is performed.

If the predetermined time $\alpha$ has passed and the preheating operation has not been performed yet, the control flow goes to steps S260–S300 to perform a processing for storing the engine-water temperature data in the back-up RAM 54. That is, steps S260 and S270 are implemented to copy the engine-water temperature data stored in the back-up RAM 54, in the N-RAM 53 if the N-RAM 53 has been cleared as a result of a switching operation of the ignition switch to the on state. Step S270 is followed by step S280 (FIG. 4) to determine whether the engine 10 has been started. If the engine 10 has not been started yet, the control flow goes to step S290 to determine whether the temperature represented by the engine-water temperature data stored in the N-RAM 53 is equal to the initial value, which permits updating of the engine-water temperature data stored in the back-up RAM 54, as described above. If the initial value is stored in the N-RAM 53, the control flow goes to step S300 to store in the back-up RAM 53 engine-water temperature data indicative of the temperature detected by the water temperature sensor 71.

If it is determined in step S240 that the predetermined time a has not passed, or if it is determined in step S250 that the preheating operation has been performed, the control flow goes to step S310 to determine whether the engine 10 has been started.

If it is determined in step S310 or step S280 that the engine 10 has already been started, the control flow goes to step S320 or S330 to turn on the ENGINE-ON flag serving as the above-indicated hysteresis data indicative of the starting of the engine 10.

If the ignition switch is switched from the off state to the on state while the ENGINE-ON flag is in the on state, that is, if an affirmative decision (YES) is obtained in step S340, the control flow goes to step S350 to set the engine-water temperature data so as to represent the initial value. Thus, one cycle of execution of the routine of FIGS. 3 and 4 is terminated.

The operation to store the engine-water temperature data in the back-up RAM 54 as described above will be further explained by reference to the time charts of FIGS. 5 and 6.

When the vehicle-operator's door is opened at a point of time t1 as indicated at (a) OPERATOR'S DOOR in FIG. 5, the ECU 50 is turned on as indicated at (b) ECU. At a point of time t2 at which the predetermined time a has passed after the ECU 50 is turned on and by which the initial value of the engine-water temperature (indicated by one-dot chained line at (i) ENGINE-WATER TEMPERATURE in FIG. 5) has been stored in the back-up RAM 54, this initial value is updated to the temperature detected by the water temperature sensor 71 (indicated by solid line at (i) ENGINE-WATER TEMPERATURE).

The engine-water temperature data stored in the back-up RAM 54 is continuously updated according to the temperature detected by the water temperature sensor 71 for a time period between points of time t2 and t3. That is, until the preheating operation is initiated at the point of time t3 as indicated at (c) PREHEATING in FIG. 5. That is, the updating of the engine-water temperature data in the back-up RAM 54 is permitted in the above-described steps S290 and S300 for the above-indicated time period because the initial value is kept stored in the N-RAM 53 for this time period.

The ENGINE-ON flag is turned on as indicated at (h) ENGINE-ON FLAG in FIG. 5, when the engine 10 is started as indicated at (g) ENGINE, following an operation of the engine starter as indicated at (f) STARTER, in response to an switching action of the ignition switch to the on state as indicated at (e) IGNITION, after the preheating operation is terminated as indicated at (c) PREHEATING.

When the ignition switch is turned off at a point of time t4 as indicated at (e) IGNITION, the engine 10 is turned off as indicated at (g) ENGINE, but the ECU 50 is kept in the on state as indicated at (b) ECU, to perform the post-processing operation. That is, if the engine-water temperature is higher than the heat-accumulator-water temperature, the high-temperature cooling water is returned from the engine 10 back to the heat accumulator 31 as indicated at (d) RETURN OF HIGH-TEMP. WATER. In addition, the engine-water temperature data stored in the back-up RAM 54 is initialized to the initial value as indicated by one-dot chain line at (i) ENGINE-WATER TEMPERATURE, according to a logical product of a fact that the ignition switch is turned off and a fact that the ENGINE-ON flag is in the on state, that is, when the ignition switch is in the off state while the ENGINE-ON flag is in the on state.

After the engine-water temperature data in the back-up RAM 54 is initialized to the initial value, the ENGINE-ON flag is turned off as indicated at (h) ENGINE-ON FLAG, and the ECU 50 is turned off as indicated at (b) ECU.

In the example of FIG. 6, the preheating operation is performed as indicated at (c) PREHEATING after the door is opened and the ECU 50 is turned on at a point of time t1 as indicated at (a) OPERATOR'S DOOR and at (b) ECU, and the door is opened again at a point of time t3 as indicated at (a) OPERATOR'S door immediately after a point of time t2 at which the ECU 50 is turned off as indicated at (b) ECU, without a previous switching operation of the ignition switch to the on state after the preheating operation. In this case, the condition to update the engine-water temperature data in the back-up RAM 54 is not satisfied, so that the back-up RAM 54 retains the engine-water temperature data as obtained before the preheating operation.

As described above, the present embodiment is arranged such that the backup RAM 54 stores the engine-water temperature data representative of the engine-water temperature before the preheating operation. Accordingly, the diagnosing apparatus is capable of accurately diagnosing the evaporative purge system on the basis of the engine-water temperature represented by the engine-water temperature data stored in the back-up RAM 54.

Then, an operation of the diagnosing apparatus to diagnose the evaporative purge system will be described referring to the flow chart of FIG. 7.

In the present diagnosing operation, steps S400, S410 and S420 are implemented to read the engine-water temperature data stored in the back-up RAM 54 after starting of the engine 10, and diagnose the warm-up state of the fuel tank 40 on the basis of the engine-water temperature represented by the engine-water temperature data, and the temperature of the intake air detected by the intake-air temperature sensor 82.

Then, steps S430, S440, S450 are implemented to diagnose the control flow goes to step S430 to permit a diagnosis of the evaporative purge system if it is determined on the basis of the engine-water temperature and the intake air temperature that the temperature within the fuel tank 40 is not higher than a predetermined threshold. Namely, the pressure within the fuel tank 40 is detected after a predetermined time has passed, and the evaporative purge system is diagnosed on the basis of the detected pressure.

The present embodiment which has been described above has the following advantages:

(1) The engine-water temperature is detected before the preheating of the engine 10, and the detected temperature is stored in the back-up RAM 54. On the basis of this stored engine-water temperature, the warm-up state of the fuel within the fuel tank 40 can be accurately detected.

(2) Since the back-up RAM 54 is used to store the engine-water temperature data representative of the engine-water temperature before the preheating operation of the engine 10, the engine-water temperature data can be retained even if the N-RAM 53 is cleared in response to a switching operation of the ignition switch.

(3) Where the ignition switch is switched from the on state to the off state during an operation of the engine 10, the temperature represented by the engine-water temperature data stored in the back-up RAM 54 is initialized to the predetermined initial value. The engine-water temperature data in the back-up RAM 54 is updated to represent the temperature as detected by the water temperature sensor 71, only when the engine-water temperature data presently stored in the back-up RAM 54 represents the predetermined initial value. This arrangement permits the engine-water temperature data stored in the back-up RAM 54 to accurately represent the engine-water temperature before the preheating operation. Even in such a case as indicated in FIG. 6 wherein the ECU 50 is once turned off after the preheating operation since the ignition switch is kept in the off state, and the ECU is again turned on immediately after it was once turned off.

(4) The switching operation of the ignition switch to the on state and the opening action of the vehicle-operator's door are detected for a variety of purposes including: as the preliminary operation to be performed before starting of the engine 10, to permit the ECU 50 to be turned on, to permit the back-up RAM 54 to store the engine-water temperature data, and to permit the preheating operation of the engine 10. This arrangement assures adequate initiation of those operations without a delay.

(5) The starting of the engine 10 is inhibited before the preheating operation so that the engine 10 can be started only after it has been sufficiently warmed up.

The illustrated embodiment described above may be modified as described below.

The heat accumulator 31 may use a heat medium other than the cooling water, for example, an oil. The preheating operation need not be performed in the manner as described above. For example, the engine 10 may be started without a preheating operation, where an operation of an ignition key or any other operation indicative of the vehicle-operator's intention to start the engine 10 is performed by the vehicle operator.

The manner of storing the engine-water temperature data in the back-up RAM 54 is not limited to that described above. In the illustrated embodiment, the engine-water temperature data stored in the back-up RAM 54 is copied in the N-RAM 53, and the engine-water temperature data in the back-up RAM 54 is permitted to be updated when the temperature represented by the engine-water temperature data in the N-RAM 53 is the predetermined initial value. However, the engine-water temperature data in the back-up RAM 54 may be permitted to be updated when the temperature represented by the data stored in the back-up RAM 54 is the predetermined initial value.

In the illustrated embodiment, the engine-water temperature data in the back-up RAM 54 is initialized to represent the predetermined initial value when the ignition switch is turned off while the ENGINE-ON flag is in the on state. However, the ENGINE-ON flag may be eliminated if a switching operation of the ignition switch to the off state during an operation of the engine can be detected without using the ENGINE-ON flag.

In the illustrated embodiment, the engine-water temperature data stored in the back-up RAM 54 is permitted to be updated only when the temperature represented by the stored data is the predetermined initial value. However, the engine-water temperature data may be updated otherwise. For instance, the engine-water temperature data is initially stored in the back-up RAM 54 when the preliminary operation performed before starting of the engine 10 is detected, and the back-up RAM 54 is prevented from updating the engine-water temperature data for a predetermined time after the detection of the preliminary operation.

Even in the above-indicated case wherein the engine-water temperature data is initially stored in the back-up RAM 54 upon detection of the preliminary operation, the engine-water temperature data stored in the back-up RAM 54 accurately represent the engine-water temperature before preheating of the engine, in the absence of an unusual operation.

The preliminary operation to be detected as an operation to be performed before starting of the engine is not limited to those in the illustrated embodiment, but may include an opening action of a vehicle door other than the vehicle-operator's door. Where the locking and unlocking states of the vehicle doors can be controlled by a remote control device not having a key, an operation of this remote control device to unlock the doors may be detected as the preliminary operation.

Where the engine 10 can be commanded to be started by a remote control device, an operation of this remote control device to start the engine 10 may be used to store the engine-water temperature data in the back-up RAM 54 before preheating of the engine 10, as well as to start the engine 10.

The back-up RAM 54 which is kept supplied with electric power by the battery 61 may be replaced by any other nonvolatile memory such as an EEPROM (Electrically Erasable Programmable Read-Only Memory).

The diagnosing device according to the present invention is not only applicable to the evaporative purge system described above, but also available as any other diagnosing device, for example, as a device to detect deterioration of a catalyst disposed in the exhaust system of an engine. That is, the principle of the present invention is applicable to a diagnosis of an engine system provided with a heat accumulating device to warm up an engine, for detecting warm-up states of desired specific portions of the engine system.

In the illustrated embodiment, the controller (the ECU 50) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to one exemplary embodiment thereof, it is to be understood that the invention is not limited to the exemplary embodiment or construction. To the contrary, the invention is intended to cover various modifications and equivalent arrangements. In addition, while the various elements of the exemplary embodiment are shown in various combinations and configurations, which are element, are also within the spirit and scope of the invention.

What is claimed is:

1. A diagnosing apparatus for diagnosing an engine system to detect a warm-up state thereof, said engine system being provided with a heat accumulating device arranged to preheat an engine, comprising:

a controller that:

detects the warm-up state of said engine system and stores warm-up data representative of the detected warm-up state in a memory before a warm-up operation of said engine is performed by said heat accumulating device; and performs a diagnosis of the warm-up state on the basis of said warm-up data stored in said memory.

2. A diagnosing apparatus according to claim 1, wherein said memory is a nonvolatile memory.

3. A diagnosing apparatus according to claim 2, wherein the controller further:

detects a preliminary operation to be performed before starting of said engine; and stores the detected warm-up data in said nonvolatile memory when said preliminary operation has been detected.

4. A diagnosing apparatus according to claim 3, wherein the controller further:

permits said heat accumulating device to warm up said engine when said engine has not been warmed-up to a predetermined warm-up state after detection of said preliminary operation; and inhibits starting of said engine until said engine has been warmed-up to said predetermined warm-up state.

5. A diagnosing apparatus according to claim 3, wherein said preliminary operation is at least one of an opening action of a door provided on a vehicle equipped with said engine system and a switching operation of an ignition switch to an on state.

6. A diagnosing apparatus according to claim 2, wherein the controller further:

detects a preliminary operation to be performed before starting of said engine;

initializes said warm-up data stored in said nonvolatile memory to a predetermined initial value upon detection of a switching operation of an ignition switch to an off state during an operation of said engine; and updates said warm-up data stored in said nonvolatile memory so as to represent the warm-up data as detected by said controller, when said controller has detected said preliminary operation and when said warm-up data stored in said nonvolatile memory represents said predetermined initial value.

7. A diagnosing apparatus according to claim 6, wherein the controller further:

permits said heat accumulating device to warm up said engine when said engine has not been warmed-up to a predetermined warm-up state after detection of said preliminary operation; and inhibits starting of said engine until said engine has been warmed-up to said predetermined warm-up state.

8. A diagnosing apparatus according to claim 6, wherein said preliminary operation is at least one of an opening action of a door provided on a vehicle equipped with said engine system and a switching operation of an ignition switch to an on state.

9. A diagnosing apparatus according to claim 1, wherein said controller diagnoses said engine system to detect at least one of an abnormality of an evaporative purge system of the engine system and a deterioration of a catalyst disposed in an exhaust system of the engine system.

10. A method of diagnosing an engine system to detect a warm-up state thereof, said engine system being provided with a heat accumulating device arranged to preheat an engine, said method comprising the steps of:

detecting the warm-up state of said engine system before a warm-up operation of said engine is performed by said heat accumulating device;

storing warm-up data representative of the detected warm-up state in a memory; and performing a diagnosis of the warm-up state on the basis of said warm-up data stored in said memory.

11. A method according to claim 10, wherein said memory is a nonvolatile memory.

12. A method according to claim 11, further comprising the step of:

detecting a preliminary operation to be performed before starting of said engine, and wherein said detected warm-up data is stored in said nonvolatile memory when said preliminary operation has been detected.

13. A method according to claim 12, further comprising the steps of:

permitting said heat accumulating device to warm up said engine when said engine has not been warmed-up to a predetermined warm-up state after detection of said preliminary operation, and inhibiting starting of said engine until said engine has been warmed-up to said predetermined warm-up state.

14. A method according to claim 12, wherein said step of detecting a preliminary operation comprises detecting at least one of an opening action of a door provided on a vehicle equipped with said engine system and a switching operation of an ignition switch to an on state.

15. A method according to claim 11, further comprising the steps of:

detecting a preliminary operation to be performed before starting of said engine;

initializing said warm-up data stored in said nonvolatile memory to a predetermined initial value upon detection of a switching operation of an ignition switch to an off state during an operation of said engine; and updating said warm-up data stored in said nonvolatile memory so as to represent the detected warm-up data when said preliminary operation has been detected and when said warm-up data stored in said nonvolatile memory represents said predetermined initial value.

16. A method according to claim 15, further comprising the steps of:

permitting said heat accumulating device to warm up said engine when said engine has not been warmed-up to a predetermined warm-up state after detection of said preliminary operation; and inhibiting starting of said engine until said engine has been warmed-up to said predetermined warm-up state.

17. A method according to claim 15, wherein said step of detecting a preliminary operation comprises detecting at least one of an opening action of a door provided on a vehicle equipped with said engine system and a switching operation of an ignition switch to an on state.

18. A method according to claim 10, wherein said step of performing the diagnosis of the warm-up state comprises diagnosing said engine system to detect at least one of an abnormality of an evaporative purge system of the engine system and a deterioration of a catalyst disposed in an exhaust system of the engine system.

19. A diagnosing apparatus for diagnosing an engine system and determining whether the diagnosis is performed based on a detected warm-up state thereof, said engine system being provided with a heat accumulating device arranged to preheat an engine, comprising:

a controller that:

detects the warm-up state of said engine system and stores warm-up data representative of the detected warm-up state in a memory before a warm-up operation of said engine is performed by said heat accumulating device; and determines whether the diagnosis of the engine system is performed on the basis of said warm-up data stored in said memory.

20. A diagnosing apparatus according to claim 19, wherein said memory is a nonvolatile memory.

21. A diagnosing apparatus according to claim 20, wherein the controller further:

detects a preliminary operation to be performed before starting of said engine; and stores the detected warm-up data in said nonvolatile memory when said preliminary operation has been detected.

22. A diagnosing apparatus according to claim 21, wherein the controller further:

permits said heat accumulating device to warm up said engine when said engine has not been warmed-up to a predetermined warm-up state after detection of said preliminary operation; and inhibits starting of said engine until said engine has been warmed-up to said predetermined warm-up state.

23. A diagnosing apparatus according to claim 21, wherein said preliminary operation is at least one of an opening action of a door provided on a vehicle equipped with said engine system and a switching operation of an ignition switch to an on state.

24. A diagnosing apparatus according to claim 20, wherein the controller further:

detects a preliminary operation to be performed before starting of said engine;

initializes said warm-up data stored in said nonvolatile memory to a predetermined initial value upon detection of a switching operation of an ignition switch to an off state during an operation of said engine; and updates said warm-up data stored in said nonvolatile memory so as to represent the warm-up data as detected by said controller, when said controller has detected said preliminary operation and when said warm-up data stored in said nonvolatile memory represents said predetermined initial value.

25. A diagnosing apparatus according to claim 24, wherein the controller further:

permits said heat accumulating device to warm up said engine when said engine has not been warmed-up to a predetermined warm-up state after detection of said preliminary operation; and inhibits starting of said engine until said engine has been warmed-up to said predetermined warm-up state.

26. A diagnosing apparatus according to claim 24, wherein said preliminary operation is at least one of an opening action of a door provided on a vehicle equipped with said engine system and a switching operation of an ignition switch to an on state.

27. A diagnosing apparatus according to claim 19, wherein said controller diagnoses said engine system to detect at least one of an abnormality of an evaporative purge system of the engine system and a deterioration of a catalyst disposed in an exhaust system of the engine system.

28. A method of diagnosing an engine system and determining whether the diagnosis is executed based on a detected warm-up state thereof, said engine system being provided with a heat accumulating device arranged to preheat an engine, said method comprising the steps of:

detecting the warm-up state of said engine system before a warm-up operation of said engine is performed by said heat accumulating device;

storing warm-up data representative of the detected warm-up state in a memory; and determining whether the diagnosis of the engine system is performed on the basis of said warm-up data stored in said memory.

29. A method according to claim 28, wherein said memory is a nonvolatile memory.

30. A method according to claim 29, further comprising the step of:

detecting a preliminary operation to be performed before starting of said engine, and wherein said detected warm-up data is stored in said nonvolatile memory when said preliminary operation has been detected.

31. A method according to claim 30, further comprising the steps of:

permitting said heat accumulating device to warm up said engine when said engine has not been warmed-up to a predetermined warm-up state after detection of said preliminary operation, and inhibiting starting of said engine until said engine has been warmed-up to said predetermined warm-up state.

32. A method according to claim 30, wherein said step of detecting a preliminary operation comprises detecting at least one of an opening action of a door provided on a vehicle equipped with said engine system and a switching operation of an ignition switch to an on state.

33. A method according to claim 29, further comprising the steps of:

detecting a preliminary operation to be performed before starting of said engine;

initializing said warm-up data stored in said nonvolatile memory to a predetermined initial value upon detection of a switching operation of an ignition switch to an off state during an operation of said engine; and updating said warm-up data stored in said nonvolatile memory so as to represent the detected warm-up data when said preliminary operation has been detected and when said warm-up data stored in said nonvolatile memory represents said predetermined initial value.

34. A method according to claim 33, further comprising the steps of:

permitting said heat accumulating device to warm up said engine when said engine has not been warmed-up to a predetermined warm-up state after detection of said preliminary operation; and inhibiting starting of said engine until said engine has been warmed-up to said predetermined warm-up state.

35. A method according to claim 33, wherein said step of detecting the preliminary operation comprises detecting at least one of an opening action of a door provided on a vehicle equipped with said engine system and a switching operation of an ignition switch to an on state.

36. A method according to claim 28, wherein said step of performing the diagnosis of the warm-up state comprises diagnosing said engine system to detect at least one of an abnormality of an evaporative purge system of the engine system and a deterioration of a catalyst disposed in an exhaust system of the engine system.

* * * * *